(12) United States Patent
Sanjeev et al.

(10) Patent No.: US 7,093,006 B2
(45) Date of Patent: Aug. 15, 2006

(54) METHOD OF DYNAMICALLY CONFIGURING ACCESS TO SERVICES

(75) Inventors: Raghunandan Sanjeev, Grays Lake, IL (US); Daniel S. Rokusek, Long Grove, IL (US); Wayne G. Baer, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 769 days.

(21) Appl. No.: 09/919,396

(22) Filed: Jul. 31, 2001

(65) Prior Publication Data

US 2003/0028625 A1    Feb. 6, 2003

(51) Int. Cl.
  G06F 15/16  (2006.01)
  G06F 15/173 (2006.01)
  G06F 3/00   (2006.01)
  H04N 7/16   (2006.01)

(52) U.S. Cl. ............... 709/220; 709/201; 709/204; 709/223; 710/8

(58) Field of Classification Search ............ 709/201, 709/202, 203, 206, 224, 225, 220
See application file for complete search history.

(56) References Cited

U.S. PATENT DOCUMENTS

| | | | |
|---|---|---|---|
| 5,909,183 A | 6/1999 | Borgstahl et al. | |
| 6,069,896 A | 5/2000 | Borgstahl et al. | |
| 6,484,082 B1 * | 11/2002 | Millsap et al. | 701/48 |
| 6,757,521 B1 * | 6/2004 | Ying | 455/67.11 |
| 6,757,712 B1 * | 6/2004 | Bastian et al. | 709/206 |
| 6,799,210 B1 * | 9/2004 | Gentry et al. | 709/223 |
| 6,801,942 B1 * | 10/2004 | Dietrich et al. | 709/225 |
| 6,826,607 B1 * | 11/2004 | Gelvin et al. | 709/224 |

OTHER PUBLICATIONS

Opening Bluetooth for Technical Tasks—Possibilities and Challenges for Automotive Application by Horst Wunderlich and Martin Schwab, DaimlerChrysler R&T, Germany, Lars-Berno Fredriksson, Kvaser AB, Sweden. From the Bluetooth Conference Jun. 13-16, 2000.*
The Potential of Bluetooth in Automotive Applications by Horst Wunderlich and Martin Schwab, DaimlerChrysler R&T, Germany, and Lars-Berno Fredriksson, Kvaser AB, Sweden. From the Bluetooth Geneva Conference, Apr. 4-5, 2000.*

* cited by examiner

Primary Examiner—Kim Huynh
Assistant Examiner—Alan S Chen
(74) Attorney, Agent, or Firm—Kevin D. Wills; Thomas V. Miller; Terri S. Hughes

(57) ABSTRACT

A method of dynamically configuring access to services (114, 130) between a remote communications node (104) and a remote communications device (106) includes determining if the remote communications node (104) is communicating with a distributed communications system (100). The remote communications node (104) is configured as a primary gateway (301, 401) if the remote communications node (104) is communicating with the distributed communications system (100) and configured as a secondary gateway (303, 403) if it is not. A remote communications device (106) is initialized and the remote communications node (104) and remote communications device (106) are dynamically configured to optimally access services (114, 130) in a serial configuration.

32 Claims, 3 Drawing Sheets

METHOD OF DYNAMICALLY CONFIGURING ACCESS TO SERVICES

FIELD OF THE INVENTION

This invention relates generally to configuring electronic devices and, more particularly a method of dynamically configuring electronic devices.

BACKGROUND OF THE INVENTION

There is an ever-increasing demand for wireless communications. Wireless subscribers desire to have access to information at any time and at any place. One of the fastest growing markets for providing wireless services is known as "telematics" and entails delivering a wide spectrum of information via wireless links to vehicle-based subscribers. The information can originate from multiple sources, such as the Internet and other public, private, and/or government computer-based networks; wireless telecommunications such as cellular, Personal Communication Service (PCS), satellite, land-mobile, and the like; terrestrial and satellite direct broadcasts including traditional AM/FM bands, broadband, television, video, geolocation and navigation via a global position system (GPS), and the like; concierge services providing roadside assistance, emergency calling, remote-door unlocking, accident reporting, travel conditions, vehicle security, stolen vehicle recovery, remote vehicle diagnostics, and the like; advertising services identifying names and locations of businesses such as gas stations, restaurants, hotels, stores, and offices, and the like; tourist services such as points of interest, directions, hours of access, and the like; and many other sources that can provide information of any type. Many of the above services are not universally available, but rather they are transient in both the time and geoposition domains.

Information can be communicated to telematics devices over relatively long wireless links, such as from a satellite or terrestrial node, or from relatively short wireless or wired links, such as from in-vehicle equipment or from hand-held devices like PDAs, portable computers, cellular phones, and the like.

The services provided by telematics systems are not restricted to vehicle-based subscribers, and they can also be provided to subscribers at home, at work, or elsewhere. With so much mobility, the equipment located in the subscriber's vehicle, or the equipment carried by or otherwise serving a subscriber, needs a way to connect with the plethora of services that are potentially available to it. The equipment needs a way to optimally utilize available client devices to discover, identify, select, and invoke services that are of interest to it, as well as to disconnect from services that are no longer of interest to it.

Mobile systems also may have rigorous security requirements in order to protect the identity and location of mobile subscribers, as well as to insure that the mobile equipment, including software, is not involuntarily altered or corrupted, for example, by downloading uncertified software that could replace, infect, or otherwise have an adverse impact upon the software residing in the system. Known systems that dynamically provide access to services typically download software code to the client platform and execute the code on the client platform. Not only does this introduce potentially dangerous security issues, but also the downloaded code can overwhelm the mobile system's limited memory capability.

Accordingly, there is a significant need for methods and apparatus that are more conserving of application and platform resources, particularly for mobile platforms.

There is also a significant need for methods of optimally configuring client platforms to efficiently utilize other available client platforms to access services in a manner that is independent of the interface layer between a client platform, another client platform and a server.

There is a further need for methods for client platforms to access services in realtime while utilizing available client platforms in an optimal manner.

Accordingly, there is a significant need for methods of dynamically configuring access to services that overcome the deficiencies of the prior art outlined above.

BRIEF DESCRIPTION OF THE DRAWINGS

Referring to the drawing.

Figure 1:
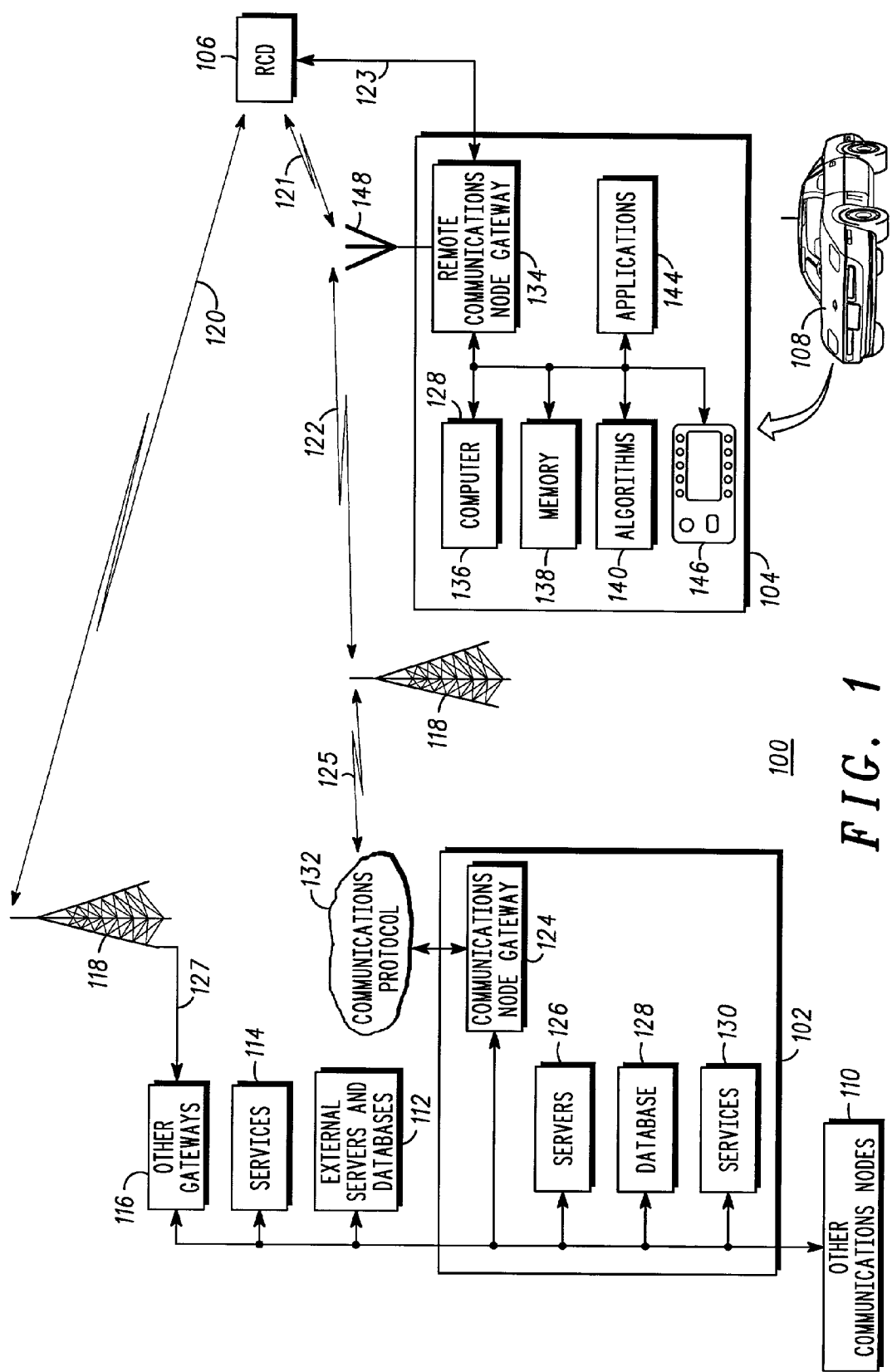
FIG. 1 depicts an exemplary distributed communications system, according to one embodiment of the invention.

It will be appreciated that for simplicity and clarity of illustration, elements shown in the drawing have not necessarily been drawn to scale. For example, the dimensions of some of the elements are exaggerated relative to each other. Further, where considered appropriate, reference numerals have been repeated among the Figures to indicate corresponding elements.

DESCRIPTION OF THE PREFERRED EMBODIMENTS

The present invention is a method of dynamically configuring access to services between a remote communications node and a remote communications device with software components running on mobile client platforms and devices and on remote server platforms. To provide an example of one context in which the present invention may be used, an example of a method of dynamically configuring access to services will now be described. The present invention is not limited to implementation by any particular set of elements, and the description herein is merely representational of one embodiment. The specifics of one or more embodiments of the invention are provided below in sufficient detail to enable one of ordinary skill in the art to understand and practice the present invention.

FIG. 1 depicts an exemplary distributed communications system (DCS) 100 according to one embodiment of the invention. Shown in FIG. 1 are examples of components of a distributed communications system 100, which comprises among other things, a communications node 102 coupled to a remote communications node (RCN) 104. The communications node 102 and remote communications node 104 can be coupled via a communications protocol 132 that can include standard cellular network protocols such as GSM, TDMA, CDMA, and the like. Communications protocol 132 can also include standard TCP/IP communications equipment. The communications node 102 is designed to provide wireless access to remote communications node 104, to enhance regular video and audio broadcasts with extended video and audio content, and provide personalized broadcast, information and applications to the remote communications node 104.

Communications node 102 can also serve as an Internet Service Provider to remote communications node 104 through various forms of wireless transmission. In the embodiment shown in FIG. 1, communications protocol 132 is coupled to local nodes 118 by a wireline or wireless link 125. Content is further communicated to remote communications node 104 from local nodes 118 via wireless link 122. Wireless communication can take place using a cellular network, paging network, FM sub-carriers, satellite networks, and the like. The components of distributed communications system 100 shown in FIG. 1 are not limiting, and other configurations and components that form distributed communications system 100 are within the scope of the invention.

Without limitation, one or more remote communications nodes 104 can be contained within, and optionally form an integral part of a vehicle 108, such as a car, truck, bus, train, aircraft, or boat, or any type of structure, such as a house, office, school, commercial establishment, and the like. Remote communications node 104 can also be implemented in a device that can be carried by the user of the distributed communications system 100.

Communications node 102 can also be coupled to other communications nodes 110, the Internet (not shown for clarity), external severs and databases 112 and other gateways 116. Other gateways 116 can include, for example, other distributed communication systems, one or more satellites, a public switched telecommunication network (PSTN), local area network (LAN), wide area network (WAN), and the like. Other gateways 116 can optionally be coupled to one or more local nodes 118 via wireline or wireless communication link 127. Services 114 can also be coupled to communications node 102 and other gateways 116, which will be discussed further below.

As shown in FIG. 1, a remote communications device (RCD) 106 can interface with distributed communications system 100 via remote communications node 104 or through a local node 118 and any of the other gateways 116 discussed above. Remote communications device 106 without limitation can include a wireless unit such as a cellular or Personal Communication Service (PCS) telephone, a pager, a handheld computing device such as a personal digital assistant (PDA) or Web appliance, a personal computer, or any other type of communications and/or computing device. Remote communications device 106 can communicate with remote communications node 104 using wireline link 123 or wireless link 121. Remote communication device 106 can also communicate with other gateways 116 (optionally through local node 118) via wireless communication link 120.

Users of distributed communications system 100 can create user-profiles and configure/personalize their user-profile, enter data, and the like through a user configuration device, such as a computer. Other user configuration devices are within the scope of the invention and can include a telephone, pager, PDA, Web appliance, and the like. Remote communications nodes 104 and remote communications devices 106 can each have their own unique user profiles respectively. User-profiles and other configuration data is preferably sent to communications node 102 through a user configuration device, such as a computer with an Internet connection using a web browser or though a remote communications device 106 such as a telephone, PDA and the like. For example, a user can log onto the Internet in a manner generally known in the art and then access a configuration web page of the communications node 102. Once the user has configured the web page selections as desired, he/she can submit the changes. The new configuration, data, preferences, and the like, including an updated user-profile, can then be transmitted to remote communications node 104 from communications node 102.

As shown in FIG. 1, communications node 102 can comprise a communications node gateway 124 coupled to various hardware and software blocks. The hardware can include servers 126, databases 128, and the like. Servers can comprise a processor with associated memory. Memory comprises control algorithms, and can include, but is not limited to, random access memory (RAM), read only memory (ROM), flash memory, electrically erasable programmable ROM (EEPROM) and other memory such as a hard disk, floppy disk, and/or other appropriate type of memory. Memory can contain stored instructions, tables, data, and the like, to be utilized by servers 126. Communications node 102 can initiate and perform communications with remote communications nodes 104, other communications nodes 110, external databases and servers 112, other gateways 116, services 114, and the like, shown in FIG. 1 in accordance with suitable computer programs, such as control algorithms stored in memory. Servers 126 in communications node 102, while illustrated as coupled to communications node 102, could be implemented at any hierarchical level(s) within distributed communications system 100. For example, servers could also be implemented and distributed within other communication nodes 102, local nodes 118, remote communications nodes 104, and the like.

Servers 126 can comprise, for example, traffic servers, route servers, point-of-interest (POI) servers, user-profile servers, navigation servers, and the like. Databases 128 can comprise, for example, map databases, user-profile databases, customer databases, advertiser databases, and the like.

Communications node 102 also comprises services 130, which can be located at communications node 102, distributed between any number of communications nodes, local nodes 118, remote communications nodes 104, and the like. A service can be an encapsulation of some functionality that is of use to one or more service-using entities (current or anticipated) or that needs to be isolated from the service-using entity for some reason. A service can provide access to information or perform some computation. Services 130 also provide a desired functionality of a human user. Local services can provide access to functionality that is local to the platform, such as an on-board global positioning system (GPS) device. Remote services can be offered by an external server, such as a communications node 102, remote communications node 104, and the like, and are accessed via a communications link, such as a wireline or wireless link discussed above. Distributed services can be offered to remote communications node 104 and remote communications device 106 and are services that reside in, and are distributed to, one or more nodes of distributed communications system 100. All services whether internal to communications node 102 or external to communications node 102 have the same functionality and are hereinafter referred to as services 114, 130.

Communications node gateway 124 is coupled to remote communications node gateway 134 via antenna 148 and communication links described above. Each of communications node gateway 124, remote communications node gateway 134 and other gateways 116 comprise network access devices (NAD's) known to those skilled in the art.

Remote communications node gateway 134 is coupled to various components of remote communications node 104. As shown in FIG. 1, remote communications node 104 comprises a computer 136, preferably having a microprocessor, and memory 138 comprising control algorithms 140, and can include, but is not limited to, random access memory (RAM), read only memory (ROM), flash memory, electrically erasable programmable ROM (EEPROM) and other memory such as a hard disk, floppy disk, and/or other appropriate type of memory. Memory 138 can contain stored instructions, tables, data, and the like, to be utilized by computer 136. Memory 138 contains and runs an operating system and applications 144 to control and communicate with onboard peripherals. Remote communications node 104 can optionally contain and control one or more digital storage devices (not shown) to which real-time broadcasts and navigational data can be digitally recorded. The storage devices may be hard drives, flash disks, or other storage media. The same storage devices can also preferably store digital data that is wirelessly transferred to remote communications node 104.

Remote communications node 104 comprises a user interface device 146 comprising various human interface (H/I) elements such as a display, a multi-position controller, one or more control knobs, one or more indicators such as bulbs or light emitting diodes (LEDs), one or more control buttons, one or more speakers, a microphone, and any other H/I elements required by the particular applications to be utilized in conjunction with remote communications node 104. User interface device 146 is coupled to applications 144 and can request and display content and data including, navigation route data, digital roadmap data, personal data, email, audio/video, and the like. The invention is not limited by the user interface device 146 or the (H/I) elements depicted in FIG. 1. As those skilled in the art will appreciate, the user interface device 146 and (H/I) elements outlined above are meant to be representative and to not reflect all possible user interface devices or (H/I) elements that may be employed.

In FIG. 1, communications node 102 remote communications node 104 and remote communications device 106, perform distributed, yet coordinated, control functions within distributed communications system 100. Elements in communications node 102 and elements in remote communications node 104 are merely representative, and distributed communications system 100 can comprise many more of these elements within other communications nodes 102 and remote communications nodes 104. Although only one remote communications node 104 and one remote communications device 106 are shown in FIG. 1, the invention encompasses any number of these nodes and is not limited by the particular configuration depicted in FIG. 1. Distributed communications system 100 can also include fewer elements than show in FIG. 1. For example, distributed communications system 100 can include any number and any combination of the nodes depicted in FIG. 1.

Software blocks that perform embodiments of the invention are part of computer program modules comprising computer instructions, such as control algorithms, that are stored in a computer-readable medium such as memory described above. Computer instructions can instruct processors to perform methods of operating communications node 102 and remote communications node 104. In other embodiments, additional modules could be provided as needed.

The particular elements of the distributed communications system 100, including the elements of the data processing systems, are not limited to those shown and described, and they can take any form that will implement the functions of the invention herein described.

Figure 2:
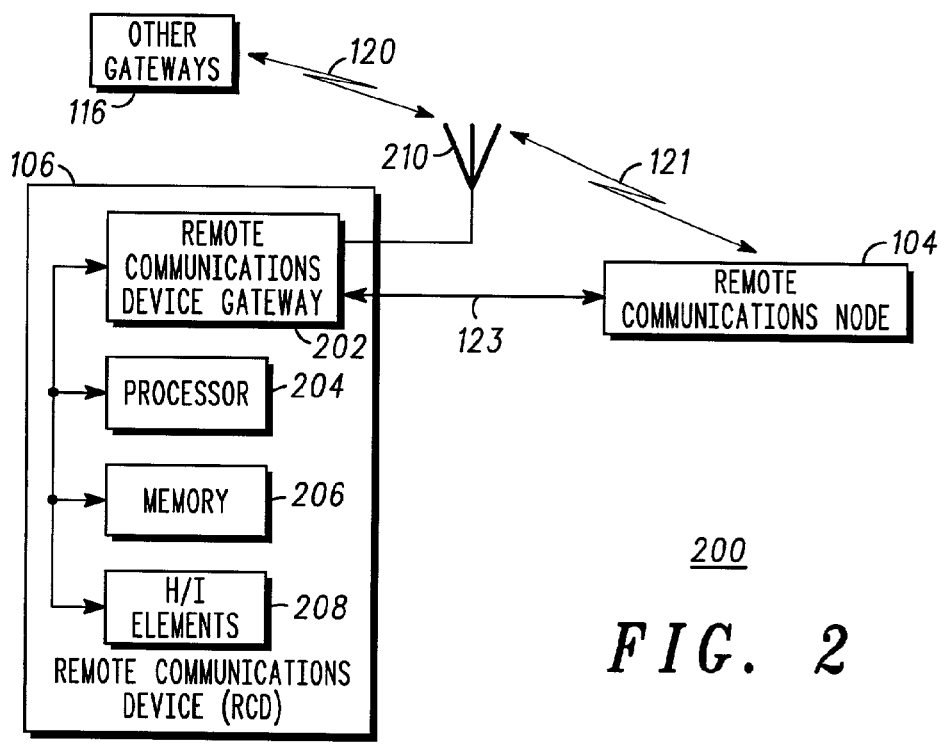
FIG. 2 illustrates a simplified block diagram of a remote communications device, according to one embodiment of the invention.

FIG. 2 illustrates a simplified block diagram 200 of a remote communications device 106, according to one embodiment of the invention. As shown in FIG. 2, remote communications device 106 comprises a remote communications device gateway 202, which further comprises a network access device (NAD) as described above. Remote communications device gateway 202 is coupled to antenna 210 to send/receive communications via wireless links 120, 121 and wireline link 123 described above. Remote communications device gateway 202 is also coupled to processor 204 and memory 206, and can include, but is not limited to, random access memory (RAM), non-volatile memory such as read only memory (ROM) or electrically erasable programmable ROM (EEPROM), and contains stored instructions, tables, data, and the like, to be utilized by processor 304.

Remote communications device also includes a user interface device 208 comprising various human interface (H/I) elements such as a display, a multi-position controller, one or more control knobs, one or more indicators such as bulbs or light emitting diodes (LEDs), one or more control buttons, one or more speakers, a microphone, and any other H/I elements required. User interface device 208 is coupled to processor 204 and memory 206 and can request and display content and data including, navigation route data, digital roadmap data, personal data, email, audio/video, and the like. The invention is not limited by the user interface device 208 or the (H/I) elements depicted in FIG. 1. As those skilled in the art will appreciate, the user interface device 208 and (H/I) elements outlined above are meant to be representative and to not reflect all possible user interface devices or (H/I) elements that may be employed.

Figure 3:
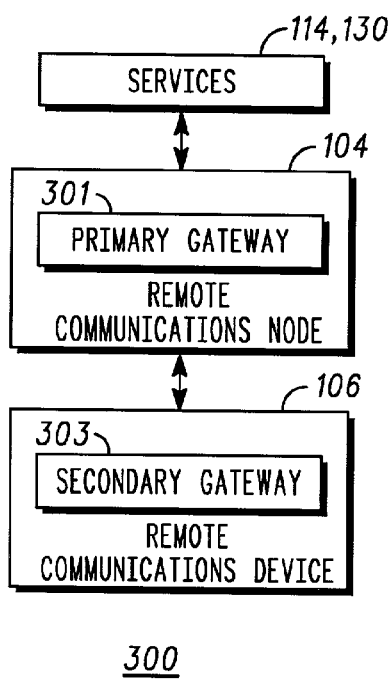
FIG. 3 illustrates a simplified block diagram of a dynamically configured remote communications node and a remote communications device, according to one embodiment of the invention.

FIG. 3 illustrates a simplified block diagram 300 of a dynamically configured remote communications node 104 and a remote communications device 106, according to one embodiment of the invention. As shown in FIG. 3, remote communications node 104 and remote communications device 106 are accessing services 114, 130 in a serial configuration. In the present serial configuration shown in FIG. 3, remote communications node gateway 134 (shown in FIG. 1) is functioning as a primary gateway 301 (functioning as a server) with remote communications device gateway 202 (shown in FIG. 1) functioning as a secondary gateway 303 (functioning as a client). In the embodiments shown, the secondary gateway operates through the network access device in that particular node that is being used by a user. The primary gateway operates via another node, between the secondary gateway and the services 114, 130 being accessed by the user. Services 114, 130 are communicated through the primary gateway to the secondary gateway with the respective nodes operating as the primary and secondary gateways respectfully, in a dynamic, serial and optimal configuration as determined automatically though software, hardware, and the like, or though a user-programmable function.

The embodiment shown in FIG. 3 can occur when remote communications node 104 is already communicating with distributed communications system 100 and remote communications device 106 is subsequently initialized. The initialization of remote communications device 106 can occur when remote communications device 106 is powered-up in the vicinity of remote communications node 104 if remote communications device 106 communicates with remote communications node 104 through wireless link 121. The initialization of remote communications device 106 can also occur through power up by coupling to remote communications node 104 through wireline link 123.

Figure 4:
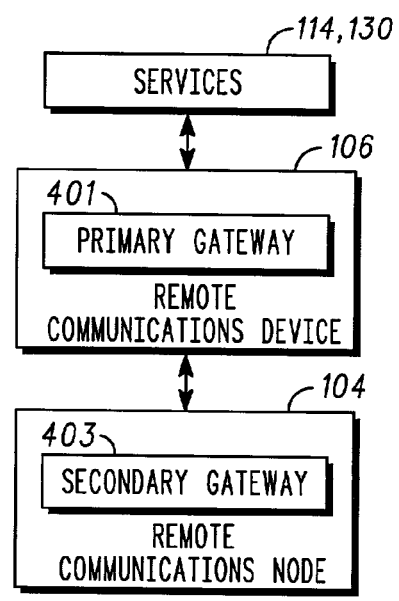
FIG. 4 illustrates a simplified block diagram of a dynamically configured remote communications node and a remote communications device, according to another embodiment of the invention.

FIG. 4 illustrates a simplified block diagram 400 of a dynamically configured remote communications node 104 and a remote communications device 106, according to another embodiment of the invention. As shown in FIG. 4, remote communications node 104 and remote communications device 106 are accessing services 114, 130 in a serial configuration. In the present serial configuration shown in FIG. 4, remote communications device gateway 202 is functioning as a primary gateway 401 (functioning as a server) with remote communications node gateway 134 functioning as a secondary gateway 403 (functioning as a client).

In both FIGS. 3 and 4, once both remote communications node 104 and remote communications device 106 are initialized, both are dynamically configured to access services 114, 130 in a serial configuration with one functioning as the primary gateway and the other as a secondary gateway. During initialization, operation, or while negotiating for services 114, 130, remote communications node 104 and remote communications device 106 can be reconfigured to function as the secondary gateway 303, 403 or the primary gateway 301, 401 in order to optimize access services 114, 130. The configuring and reconfiguring of remote communications node 104 and remote communications device 106 can occur, for example and without limitation, to minimize cost to a user, minimize communication time or power up time, optimize one or more communication links to minimize the number or type of communication links, maximize communication link quality, utilize the most efficient transceiver, and the like.

In another embodiment of the invention, remote communications node 104 and remote communications device 106 can be dynamically configured as described above through the use of a user-programmable function, such as a command input by a user via RCN 104, RCD 106, a user configuration device coupled to communications node 102, and the like. User-programmable function can comprise, for example, a macro, and the like, that will automatically configure RCN 104 and RCD 106 to function as either a secondary gateway 303, 403 or a primary gateway 301, 401 to optimize cost, time, quality of service, communication link utilization, most efficient transceiver, and the like.

As an example of a specific implementation of an embodiment of the invention, a remote communications node 104 equipped with Blue Tooth™ short-range wireless capability can be mounted in a vehicle 108. Remote communications node 104 can provide content and data communications, including audio and video, over a cellular communications link using a NAD such as remote communications node gateway 134. In effect, remote communications node 104 with Blue Tooth™ creates a personal area network accessible by Blue Tooth™ enabled remote communications devices 106 such as a PDA, cellular phone, laptop, and the like. Remote communications node 104 can function as either a server to provide services, or as a client to obtain services. For example, remote communications node 104 can provide Internet or email services to a laptop, or it can obtain voice communication services from a portable phone brought into a vehicle 108 and within the vicinity of the embedded Blue Tooth™. Depending on which services are to be accessed and in what geographic location, remote communications node 104 and remote communications device 106 can be configured as secondary (client) or primary (server) gateways respectively to optimally access services. Configuration can occur automatically or though a user-programmable function selected on either remote communications node 104, remote communications device 106 or some combination thereof.

At power-up and initialization of remote communications node 104, it can scan to determine if a NAD is present, for example, a remote communications device gateway 202. If so, RCN 104 can configure remote communications node gateway 134 as a secondary gateway 403 with RCN 104 functioning as a client. If RCN 104 is already powered-up, RCN 104 can function as a primary gateway 301 (server) and scan for remote communication devices 106, using for example, a class of device (COD) search set as telephony. Upon finding the remote communications device 106, RCN 104 can then perform a service discovery algorithm and search for a particular or requested service 114, 130 with RCD 106 functioning as a secondary gateway. If the desired service 114, 130 are found by RCD 106, then the roles of primary and secondary gateways can be switched in order to optimally access services 114, 130.

Figure 5:
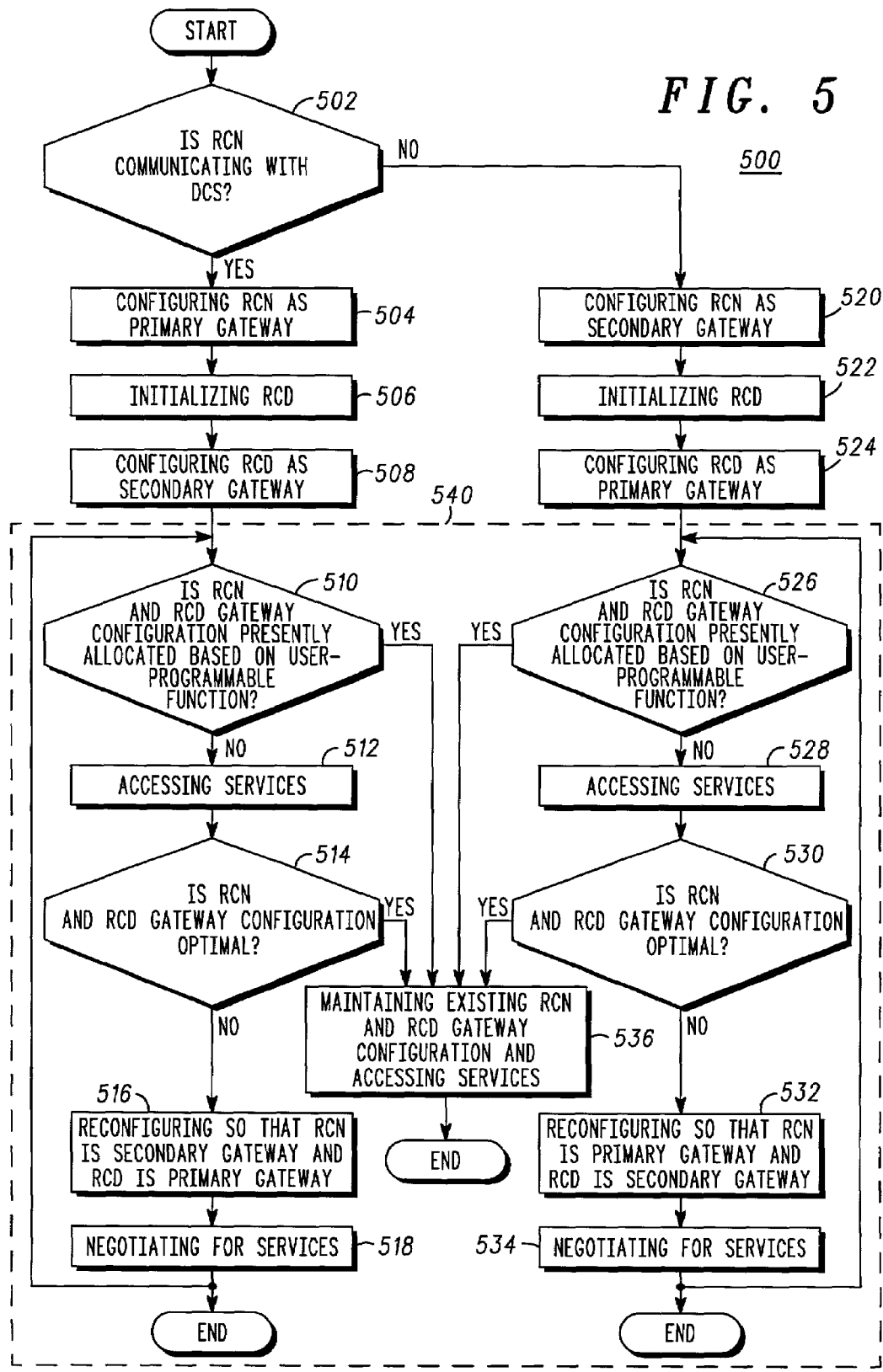
FIG. 5 illustrates a flow diagram of a method of dynamically configuring access to services, according to one embodiment of the invention.

FIG. 5 illustrates a flow diagram 500 of a method of dynamically configuring access to services, according to one embodiment of the invention. In step 502, RCN 104 is initialized and it is determined if RCN 104 is communicating with distributed communications system 100. For example, it is determined if RCN 104 is communicating with communications node 102. If RCN 104 is communicating with distributed communications system 100, in step 504 RCN 104 is configured as a primary gateway 301. In step 506, an RCD 106 is initialized in a manner as described above and RCN 104 searches for RCD 106. In step 508, when RCD 106 is found, RCD 106 is configured as the secondary gateway 303.

The steps included in dashed box 540 depicted in FIGS. 5 and 6 are steps that occur during the dynamic configuration of RCN 104 and RCD 106. In step 510, it is determined if the RCN 104 and RCD 106 gateway configuration presently allocated in steps 504 through 508 are based on a user-programmable function. If the gateway configuration between RCN 104 and RCD are allocated based on a user-programmable function, then the existing RCN 104 and RCD 106 gateway configuration is maintained and services 114, 130 are accessed per step 536.

If the RCN 104 and RCD 106 gateway configuration is not presently allocated based on a user-programmable function, the services 114, 130 are accessed via step 512. In step 514 it is determined if the RCN 104 and RCD 106 gateway configuration is optimal for the services 114, 130 being accessed. If the gateway configuration is optimal, then the existing RCN 104 and RCD 106 gateway configuration is maintained and services 114, 130 are accessed per step 536.

If the RCN 104 and RCD 106 gateway configuration is not optimal, then RCN 104 is reconfigured to be the secondary gateway 403 and the RCD 106 is reconfigured to be the primary gateway 401 per step 516. In step 518, new or existing services 114, 130 are negotiated for between RCN 104 and one or more RCD's 106 and the dynamic configuration of RCN 104 and RCD 106 to optimally access services 114, 130 in a serial configuration continues via the return arrow to step 502.

If in step 502 it is determined that RCN 104 is not communicating with distributed communications system 100 upon initialization of RCN 104, then RCN 104 is configured as the secondary gateway 403 per step 520, and RCN 104 searches for RCD 106. In step 522, an RCD 106 is initialized in a manner as described above. In step 524, RCD 106 is configured as the primary gateway 401.

In step 526, it is determined if the RCN 104 and RCD 106 gateway configuration presently allocated in steps 520 through 524 are based on a user-programmable function. If the gateway configuration between RCN 104 and RCD are allocated based on a user-programmable function, then the existing RCN 104 and RCD 106 gateway configuration is maintained and services 114, 130 are accessed per step 536.

If the RCN 104 and RCD 106 gateway configuration is not presently allocated based on a user-programmable function, the services 114, 130 are accessed via step 528. In step 530 it is determined if the RCN 104 and RCD 106 gateway configuration is optimal for the services 114, 130 being accessed. If the gateway configuration is optimal, then the existing RCN 104 and RCD 106 gateway configuration is maintained and services 114, 130 are accessed per step 536.

If the RCN 104 and RCD 106 gateway configuration is not optimal, then RCN 104 is reconfigured to be the primary gateway 301 and the RCD 106 is reconfigured to be the secondary gateway 303 per step 532. In step 534, new or existing services 114, 130 are negotiated for between RCN 104 and one or more RCD's 106 and the dynamic configuration of RCN 104 and RCD 106 to optimally access services 114, 130 in a serial configuration continues via the return arrow to step 502.

The method of the invention offers the advantage of allowing electronic devices in a telematics, LAN or WAN environment to be dynamically configured in real-time to access services from each other independent of the transport layer between a client, another client and a server. It allows a single remote communications node and any number of remote communications devices to switch between mutually exclusive server and client functions through both self-configuration and external configuration through another device or a user-programmable function. This allows a user to take advantage of less expensive access to services, more efficient access to services through existing networks, and to access services through the highest quality and least expensive communication link(s) available in a given environment or location.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

The invention claimed is:

1. In a distributed communications system, a method of dynamically configuring access to services between a wireless remote communications node and a wireless remote communications device comprising:
   determining if the wireless remote communications node is communicating with the distributed communications system over a wireless communication link;
   configuring the wireless remote communications node as a primary wireless gateway if the wireless remote communications node is communicating with the distributed communications system and configuring the wireless remote communications node as a secondary wireless gateway if the wireless remote communications node is not communicating with the distributed communications system;
   initializing the wireless remote communications device; and
   dynamically configuring the wireless remote communications node, and the wireless remote communications device to optimally access services in a serial configuration,
   wherein dynamically configurating comprises selectively either
   configuring the remote communication node as the primary gateway wirelessly coupled to the services while configuring the remote communications device as the secondary gateway wirelessly coupled to the remote communication node, or
   configuring the remote communication device as the primary gateway wirelessly coupled to the services while configuring the remote communications node as the secondary gateway wirelessly coupled to the remote communication device.

2. The method of claim 1, wherein dynamically configuring to optimally access services comprises dynamically configuring the wireless remote communications node and the wireless remote communications device to function as either the primary wireless gateway or the secondary wireless gateway respectively to minimize user cost.

3. The method of claim 1, wherein dynamically configuring to optimally access services comprises dynamically configuring the wireless remote communications node and the wireless remote communications device to function as either the primary wireless gateway or the secondary wireless gateway respectively to minimize communication time.

4. The method of claim 1, wherein dynamically configuring to optimally access services comprises dynamically configuring the wireless remote communications node and the wireless remote communications device to function as either the primary wireless gateway or the secondary wireless gateway respectively optimize a wireless communication link.

5. The method of claim 1, wherein dynamically configuring comprises allocating the primary wireless gateway and the secondary wireless gateway between the wireless remote communications node and the wireless remote communications device based on a user-programmable function.

6. The method of claim 1, wherein the services are distributed services.

7. The method of claim 1, wherein determining if the wireless remote communications node is communicating comprises determining if the wireless remote communications node is communicating with a wireless communications node.

8. The method of claim 1, wherein dynamically configuring comprises negotiating for services between the wireless remote communications node and a
   plurality of wireless remote communications devices, and wherein the wireless remote communications node is chosen as the secondary wireless gateway and one of the plurality of wireless remote communications devices is chosen as the primary wireless gateway.

9. The method of claim 1, wherein dynamically configuring comprises negotiating for services between the wireless remote communications node and a plurality of wireless remote communications devices, wherein the wireless remote communications node is chosen as the primary wireless gateway and one of the plurality of wireless remote communications devices is chosen as the secondary wireless gateway.

10. A method of optimizing access to services in a distributed communications system having a wireless remote communications node and a wireless remote communications device comprising:

determining if the wireless remote communications node is communicating with the distributed communications system over a wireless communication link;

configuring the wireless remote communications node as a primary wireless gateway if the wireless remote communications node is wirelessly communicating with the distributed communications system and configuring the wireless remote communications node as a secondary wireless gateway if the wireless remote communications node is not wirelessly communicating with the distributed communications system;

initializing the wireless remote communications device; and dynamically configuring the wireless remote communications node and the wireless remote communications device to optimally access services in a serial configuration, wherein the wireless remote communications node reconfigures between functioning as the primary wireless gateway and the secondary wireless gateway and the wireless remote communications device reconfigures between functioning as the primary wireless gateway and the secondary wireless gateway and vise versa.

11. The method af claim 10, wherein dynamically configuring to optimally access services comprises dynamically configuring the wireless remote communications node and the wireless remote communications device to function as either the primary wireless gateway or the secondary wireless gateway respectively to minimize user cost.

12. The method of claim 10, wherein dynamically configuring to optimally access services comprises dynamically configuring the wireless remote communications node and the wireless remote communications device to function as either the primary wireless gateway or the secondary wireless gateway respectively to minimize communication time.

13. The method of claim 10, wherein dynamically configuring to optimally access services comprises dynamically configuring the wireless remote communications node and the wireless remote communications device to function as either the primary wireless gateway or the secondary wireless gateway respectively optimize a wireless communication link.

14. The method of claim 10, wherein dynamically configuring comprises allocating the primary wireless gateway and the secondary wireless gateway between the wireless remote communications node and the wireless remote communications device based on a user-programmable function.

15. The method of claim 10, wherein the services are distributed services.

16. The method of claim 10, wherein determining if the wireless remote communications node is communicating comprises determining if the wireless remote communications node is communicating with a wireless communications node.

17. The method of claim 10, wherein dynamically configuring comprises negotiating for services between the wireless remote communications node and a plurality of wireless remote communications devices, and wherein the wireless remote communications node is chosen as the secondary wireless gateway and one of the plurality of wireless remote communications devices is chosen as the primary wireless gateway.

18. The method of claim 10, wherein dynamically configuring comprises negotiating for services between the wireless remote communications node and a plurality of wireless remote communications devices, wherein the wireless remote communications node is chosen as the primary wireless gateway and one of the plurality of wireless remote communications devices is chosen as the secondary wireless gateway.

19. A computer-readable medium containing computer instructions for instructing a processor to perform a method of dynamically configuring access to services between a wireless remote communications node and a wireless remote communications device, the instruction comprising:

determining if the wireless remote communications node is communicating with the distributed communications system over a wireless communication link;

configuring the wireless remote communications node as a primary wireless gateway if the wireless remote communications node is communicating with the distributed communications system and configuring the wireless remote communications node as a secondary wireless gateway if the wireless remote communications node is not communicating with the distributed communications system;

initializing the wireless remote communications device; and dynamically configuring the wireless remote communications node and the wireless remote communications device to optimally access services in a serial configuration, wherein dynamically configuring comprises selectively either configuring the remote communication node as the primary gateway wirelessly coupled to the services while configuring the remote communications device as the secondary gateway wirelessly coupled to the remote communication node, or configuring the remote communication device as the primary gateway wirelessly coupled to the services while configuring the remote communications node as the secondary gateway wirelessly coupled to the remote communication device.

20. The computer-readable medium in claim 19, wherein dynamically configuring to optimally access services comprises dynamically configuring the wireless remote communications node and the wireless remote communications device to function as either the primary wireless gateway or the secondary wireless gateway respectively to minimize user cost.

21. The computer-readable medium in claim 19, wherein dynamically configuring to optimally access services comprises dynamically configuring the wireless remote communications node and the wireless remote communications device to function as either the primary wireless gateway or the secondary wireless gateway respectively to minimize communication time.

22. The computer-readable medium in claim 19, wherein dynamically configuring to optimally access services comprises dynamically configuring the wireless remote communications node and the wireless remote communications device to function as either the primary wireless gateway or the secondary wireless gateway respectively optimize a wireless communication link.

23. The computer-readable medium in claim 19, wherein dynamically configuring comprises allocating the primary wireless gateway and the secondary wireless gateway between the wireless remote communications node and the wireless remote communications device based on a user-programmable function.

24. The computer-readable medium in claim 19, wherein the services are distributed services.

25. The computer-readable medium in claim 19, wherein determining if the wireless remote communications node is communicating comprises determining if the wireless remote communications node is communicating with a wireless communications node.

26. The computer-readable medium in claim 19, wherein dynamically configuring comprises negotiating for services between the wireless remote communications node and a plurality of wireless remote communications devices, and wherein the wireless remote communications node is chosen as the secondary wireless gateway and one of the plurality of wireless remote communications devices is chosen as the primary wireless gateway.

27. The computer-readable medium in claim 19, wherein dynamically configuring comprises negotiating for services between the wireless remote communications node and a plurality of wireless remote communications devices, wherein the wireless remote communications node is chosen as the primary wireless gateway and one of the plurality of wireless remote communications devices is chosen as the secondary wireless gateway.

28. In a distributed communications system, a method of dynamically configuring access to services between a wireless remote communications nodes and a plurality of wireless remote communications devices comprising:
   determining if the wireless remote communications node is communicating with the distributed communications system over a wireless communication link;
   configuring the wireless remote communications node as a primary wireless gateway if the wireless remote communications node is communicating with the distributed communications system and configuring the wireless remote communications node as a secondary wireless gateway if the wireless remote communications node is not communicating with the distributed communications system;
   initializing one or more of the plurality of wireless remote communications devices;
   negotiating for services between the wireless remote communications node and one or more of the plurality of wireless remote communications devices; and
   based on the negotiation, dynamically configuring the wireless remote communications node and one or more of the wireless remote communications devices to optimally access services in a serial configuration.

29. The method of claim 28, wherein dynamically configuring to optimally access services comprises dynamically configuring the wireless remote communications node and one or more of the plurality of wireless remote communications devices to function as either the primary wireless gateway or the secondary wireless gateway respectively to minimize user cost.

30. The method of claim 28, wherein dynamically configuring to optimally access services comprises dynamically configuring the wireless remote communications node and one or more of the plurality of wireless remote communications devices to function as either the primary wireless gateway or the secondary wireless gateway respectively to minimize communication time.

31. The method of claim 28, wherein dynamically configuring to optimally access services comprises dynamically configuring the wireless remote communications node and one or more of the plurality of wireless remote communications devices to function as either the primary wireless gateway or the secondary wireless gateway respectively optimize a wireless communication link.

32. The method of claim 28, wherein dynamically configuring comprises allocating the primary wireless gateway and the secondary wireless gateway between the wireless remote communications node and one or more of the plurality of wireless remote communications devices based on a user-programmable function.

* * * * *